March 27, 1962 W. I. EVANS 3,026,680
HYDRAULIC SYSTEM FOR PATTERN CONTROLLED MACHINE
Filed Nov. 28, 1958 4 Sheets-Sheet 1

INVENTOR.
WENDELL I. EVANS
BY
*Howard S. Keim*
*John F. Verhoeven*
ATTORNEYS.

Fig.3  Fig.8

March 27, 1962 W. I. EVANS 3,026,680
HYDRAULIC SYSTEM FOR PATTERN CONTROLLED MACHINE
Filed Nov. 28, 1958 4 Sheets-Sheet 4

INVENTOR.
WENDELL I. EVANS
BY
ATTORNEYS.

3,026,680
HYDRAULIC SYSTEM FOR PATTERN
CONTROLLED MACHINE
Wendell I. Evans, Cincinnati, Ohio, assignor to The Cincinnati Milling Machine Co., Cincinnati, Ohio, a corporation of Ohio
Filed Nov. 28, 1958, Ser. No. 777,149
16 Claims. (Cl. 60—97)

The present invention relates to a hydraulic system for effecting two dimension 180 degree tracing in a pattern controlled machine tool.

In a machine tool adapted to shape a workpiece according to the conformation of a pattern one member of the machine supports the workpiece and pattern while another machine member supports the cutting tool and a tracer follower which engages the pattern for control movement, or deflection, of the follower in accordance with the conformation of the pattern as one machine member is moved relative to the other. Movement of the machine members relative to each other, and hence movement of the cutting tool relative to the workpiece, may be effected by two hydraulic motors, one of which is a traversing motor to move the cutting tool in a traversing direction parallel to an axis of the workpiece, and the other of which may be considered a contouring motor to reciprocate the cutting tool towards and away from said axis in accordance with the conformations on the pattern.

In conventional two dimension 180 degree tracing systems a tracer valve is utilized, the movable valve member of which is connected to the follower for operation in response to control movement, or deflection, thereof. The tracer valve has two portions, one portion for controlling the traversing motor and the other portion for controlling the contouring motor. The portion controlling the contouring motor constitutes a reversing valve whereby the contouring motor is stopped when the valve member is in a null position, and is driven in one direction or the other when the valve member is moved in either direction from the null position, the speed of the motor depending on the amount the valve member is moved from the null position. The portion of the valve controlling the traversing motor constitutes a blocking valve and the valve member in that portion permits operation of the traversing motor, at its maximum speed, when the valve member is in its null position and after movement to predetermined positions in either direction from the null position, blocks operation of that motor. Thus deflection of the tracer valve follower can effect reversible operation of the contouring motor (and hence relative reversible contouring movement between the machine members) but can effect only irreversible operation of the traversing motor (and hence only relative irreversible traversing movement between the machine members). When the valve member is between the null position and the predetermined blocking positions both motors are running, the traversing motor in a predetermined traversing direction and the contouring motor in a direction determined by the direction of movement of the valve member, the relative speed of the two motors being established by the amount the valve member is moved from the null position. As the valve member is moved away from the null position and toward one of the predetermined blocking positions, the speed of the contouring motor increases and the speed of the traversing motor decreases, thus causing the cutting tool to move, relative to the workpiece, at a steeper angle to the axis, approaching an angle of 90 degrees thereto as the valve member approaches one of its blocking positions.

In theory, when the tracing valve member is moved in response to the conformation of the pattern to one of its blocking positions the traversing motor should be stopped and, since only the contouring motor should be running, the tool should be moving normal to the axis of the workpiece, either towards or away from the axis, depending on the direction the valve member has been moved, and the tool should effect a cut on the workpiece normal to the axis thereof. In practice, however, this has not been possible with conventional hydraulic systems. This is because the valve member must be freely movable within the valve in order to respond satisfactorily to movements of the follower and, when made of a size to assure free axial movement within the valve, it is not completely effective in stopping the traversing motor when in its blocking positions. The hydraulic fluid seeps past the blocking spools of the valve and the traversing motor will creep, thus making it impossible to produce a cut on the workpiece normal to the axis thereof.

The hydraulic system of the present invention effectively stops the creep of the traversing motor heretofore experienced and permits cutting of the workpiece at an angle normal to the traversing direction.

It is therefore an object of the present invention to make possible cuts at an angle normal to the traversing direction in a machine tool with a 180 degree tracer mechanism.

It is another object of the present invention to prevent creep of the traversing motor in a pattern controlled machine tool.

It is yet another object of the present invention to provide a simple, effective, positive acting, improved hydraulic system for a pattern controlled machine tool having a two dimension 180 degree tracer mechanism.

In brief, in the present invention, the hydraulic system operates automatically to connect both sides of the traversing motor to the same pressure level when the tracer valve member is moved beyond its blocking positions as a result of any creep which may initially occur when the slope of the pattern is normal to the traversing direction. This effectively stops the traversing motor and the tool is then moved normal to the axis of the workpiece solely by the contouring motor.

In one embodiment of the present invention the tracer valve is connected between the source of pressure and one side of the traversing motor. The sump is connected to the other side of the traversing motor and to the valve. The valve member, in cooperation with the valve, connects the source of pressure to said one side of the motor to run the motor when the valve member is in the null position. When the valve member is shifted to a blocking position the pressure and motor port of the valve are isolated from each other by a spool carried on the valve member. The moment any creep of the traversing motor begins the valve member is moved further from the null position and the motor port is connected to the valve discharge port, thereby connecting said one side of the motor to the sump. Since the other side of the motor is also connected to the sump, the traversing motor is stopped. Any fluid under pressure seeping past the spool in the valve isolating the motor port from the pressure port is ineffective to drive the traversing motor since the motor port is connected to the sump and the pressure is consequently dissipated.

In another embodiment of the invention the tracer valve is connected between one side of the traversing motor and the sump, the other side of the traversing motor being connected directly to the source of pressure which is also connected to the valve. When the valve member is moved to a blocking position a spool thereon isolates the motor port of the valve from the valve discharge port. Any movement of the valve member resulting from creep of the traversing motor serves to connect the valve motor port to the valve pressure port. Thus both sides of the motor are connected to pressure and the tendency of any fluid to seep out of the valve motor port passage to discharge is resisted by the fluid under pressure connected to the motor port through the valve.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 1:
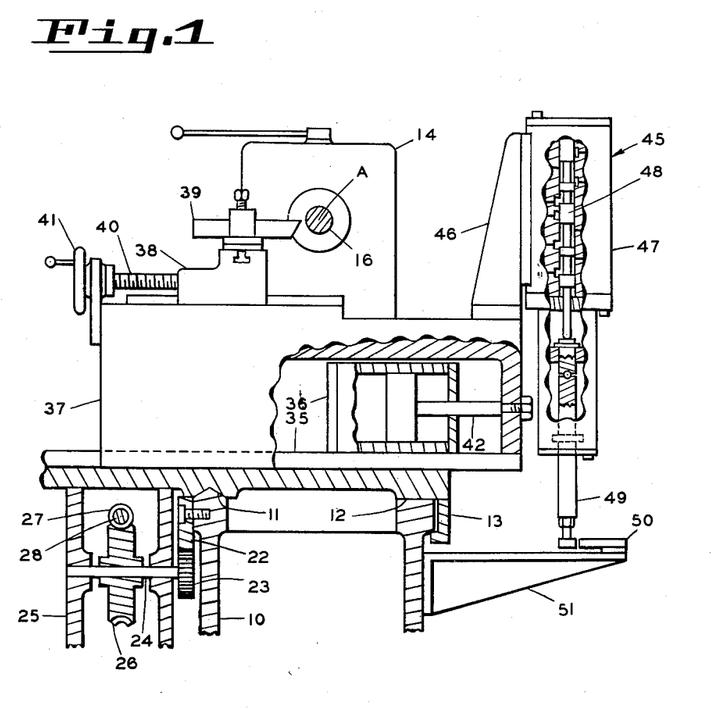
FIG. 1 is an elevational view, partly in cross-section, of a lathe in which the present invention is incorporated.
Figure 6:
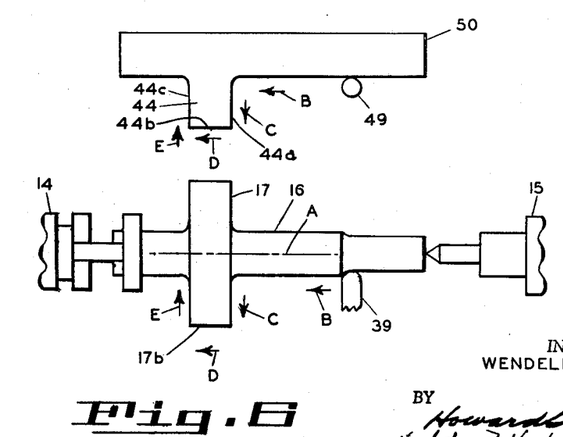
FIG. 6 is a somewhat schematic top plan view showing the movement of the follower and cutting tool along the pattern and workpiece, respectively.

The present invention may be incorporated in many types of machine tools controlled automatically for two dimensional tracing by a pattern but it is here illustrated in conjunction with a lathe. As shown in FIG. 1, the lathe has a bed 10 with ways 11 and 12 upon which is mounted the slide member or carriage 13. The bed has a headstock 14 and tailstock 15 (see FIG. 6) carried thereon between which is supported the workpiece 16 for rotation about a longitudinal axis A. For illustrative purposes a workpiece having a flange 17 with faces normal to its longitudinal axis A is shown. Secured to the bed 10 is rack 22 which is engaged with pinion 23 carried on a shaft 24. The shaft is rotably mounted in the apron 25 of carriage 13. A worm wheel 26 is carried on shaft 24 and is driven by a worm 27 on shaft 28. The shaft 28 is operatively connected through conventional gearing represented herein by spur gears 29 and 30 (see FIG. 3) to the rotary hydraulic motor 31 which defines a traversing motor to drive the carriage in a traversing direction parallel to axis A of the workpiece.

The carriage 13 has an elevated portion 35 upon which is mounted the hydraulic cylinder 36. The sides of portion 35 define dovetail ways for the slide member 37 which straddles the cylinder 36. Slidably mounted on the slide 37 is a tool support 38 in which is clamped a cutting tool 39. The tool support is manually adjustable towards and away from the workpiece by screw 40 and handwheel 41. The piston rod 42 associated with cylinder 36 is connected to the slide 37 so that the cylinder 36 defines a contouring motor which moves the slide, and hence the cutting tool 39, towards and away from the workpiece 16, normal to the longitudinal axis A thereof.

A tracer mechanism 45 is mounted on the slide 37 by bracket 46. The tracer mechanism has a housing 47, a tracer valve 48 within the housing, and a finger 49 depending from the housing. The finger 49 is positioned to engage a pattern 50 which is mounted on the bed 10 by bracket 51. The pattern 50 has a portion 44 (see FIG. 6) corresponding to the flange 17 to be machined on the workpiece. The finger 49 defines a follower which is deflected in accordance with the conformations of the pattern and operates the valve 48 to control the traversing motor 31 and the contouring motor 36.

Figures 2, 7:
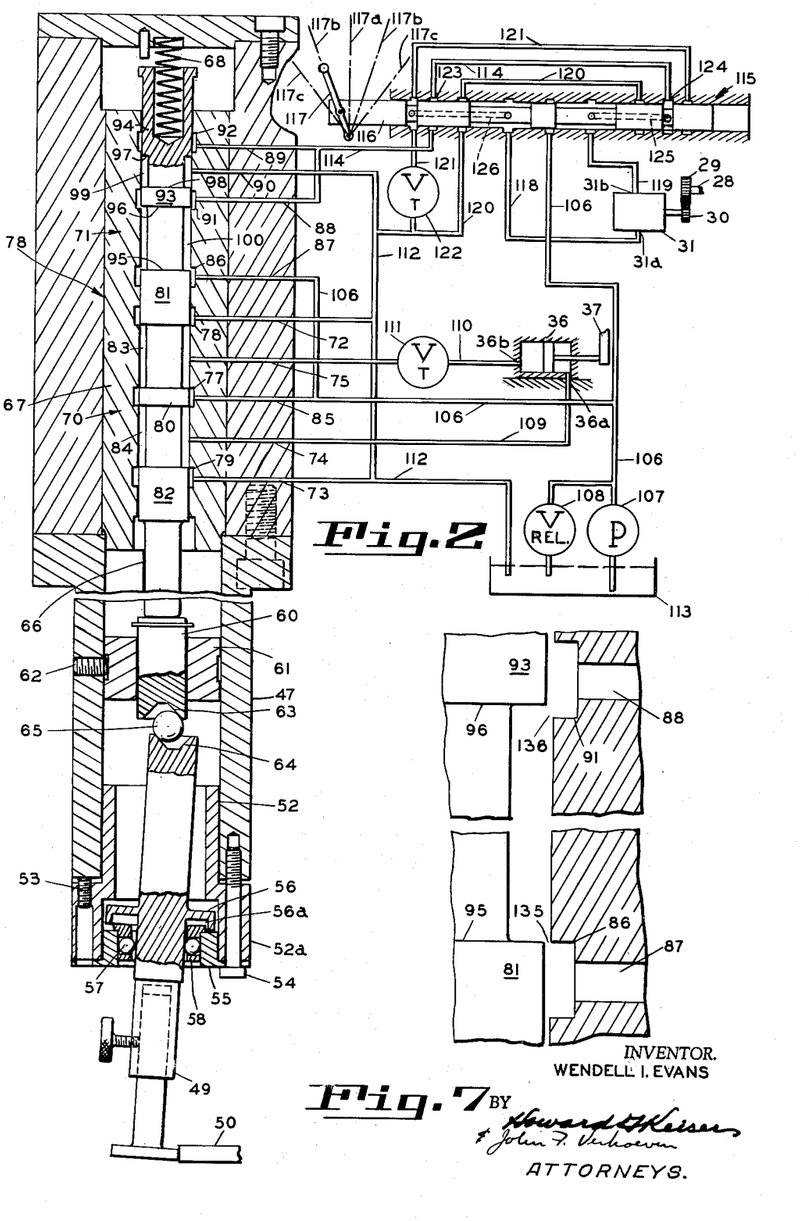
FIG. 2 is a schematic diagram of the hydraulic system of one embodiment of the present invention and the tracer mechanism by which movement of the lathe members is controlled.
FIG. 7 is an enlarged view of a portion of the valve showing, in exaggerated form, the areas through which fluid under pressure can seep.

As shown in FIGURE 2 a sleeve 52 is received in the lower end of housing 47. The sleeve 52 has an enlarged portion 52a outside the housing which threadedly receives set screws 53 adapted to engage the lower end of the housing 47 for adjustment of the sleeve relative thereto. The sleeve is secured to the housing by bolts 54 extending through portion 52a. A cap 55 is received in the sleeve 52, the head of the cap 55 being secured to the sleeve by bolts (not shown). The finger 49, which has a flange 56, extends through the sleeve 52 and cap 55 with the flange 56 above the cap for engagement therewith to hold the finger in the housing. Balls 57 are circumferentially spaced about the finger and are held within the cap 55 by a ball retainer ring 58 the head of which is supported on the upper surface of the cap 55. The flange 56 has an annular recess 56a to receive the head of the ring 58. The balls 57 are in contact with the cap 55 and finger 49 and provide a pivot about which the finger can be tilted.

An axially movable member 60 is slidably received in a bushing 61 secured within the housing 47 by set screw 62 above the finger 49. The lower end of member 60 and the upper end of finger 49 have conical shaped recesses 63 and 64, respectively, in which the ball 65 is received. It will be evident that the member 60 will be moved up and down in accordance with the amount the finger 49 is tilted, the member 60 being in its lowest position when the finger 49 hangs free and is oriented vertically in a neutral position when the finger is not deflected by the pattern 50 and no tilt is imparted thereto.

The tracer valve 48 comprises a valve member or plunger 66 slidably received in and axially movable relative to a valve bushing 67 which is snugly held in the housing 47. A spring 68 engaged with the top of the housing 47 is received in the upper portion of the valve plunger 66 to urge that member downwardly into engagement with the slidable member 60, which, in turn, urges the finger 49 normally into the vertical position without tilt when not engaged with the pattern 50. When the finger 49 is deflected a predetermined amount the valve member will assume a null position, described more fully hereafter. When deflected less than said amount, or under deflected, the valve member will assume a position below said null position; when deflected a greater amount than said amount, or overdeflected, the valve member will assume a position above said null position.

The tracer valve 48 defined by the valve bushing 67 and the movable member 66 constitutes two portions, one portion 70 of which controls the contouring motor 36, and the other portion 71 of which controls the traversing motor 31. The portion 70 comprises pressure port 85, discharge ports 72 and 73, and, between the pressure and discharge ports, the motor ports 74 and 75. The pressure port 85 and the discharge ports 72 and 73 terminate in annular grooves 77, 78, and 79 respectively on the inner wall of bushing 67. In the valve portion 70, cooperating with ports 85, 72, and 73, are spaced spools 80, 81, and 82 carried on the movable plunger 66. Like a reversing valve, these spools are spaced relative to each other and the port passages so that when the spool 80, which is the same width as the groove 77, is moved below that groove the pressure port 85 is connected to motor port 75 through the annular channel 83 between the spools 80 and 81, and the discharge port 72 is blocked. In this position of the valve member 66 the pressure port 85 is isolated from motor port 74, and that port is connected to discharge port 73 through the annular channel 84 between the spools 80 and 82. Thus the contouring motor 36 is operated to move the tool 39 and tracing finger 49 toward the workpiece 16 and pattern 50. When the plunger 66 is raised to move the spool 80 above the groove 77 the pressure port 85 is connected to motor port 74, and motor port 75 is connected to discharge port 72, to reverse operation of the motor 36. When the valve plunger 66 is in a null position with the spool 80 in registration with groove 77, the spools 81 and 82 are in registration with grooves 78 and 79, respectively, and the contouring motor 36 is stopped. It should be noted that any fluid which seeps past spool 80 when the valve is in the null position will flow equally to motor passages 74 and 75 so that creep will not occur in motor 36.

The valve portion 71, which controls the operation of traversing motor 31, has a port passage 87, a pair of connected port passages 88 and 89 on one side thereof, and a port passage 90 between the ports 88 and 89. The port passages 87, 88, and 89 terminate in annular grooves 86, 91, and 92 on the inner wall of bushing 67. Cooperating with these grooves are the upper end of spool 81 and the spaced spools 93 and 94, respectively. When the valve member 66 is in the null position the spool 93, which is the same width as groove 91, and the spool 81 straddle a portion of grooves 91 and 86, the upper shoulder 95 of spool 81 lying below the upper edge of groove 86 and the lower shoulder 96 of spool 93 lying above the lower edge of groove 91. Therefore, the ports 88 and 87 are connected through the annular channel 100. With the valve member 66 in the null position the spool 94 blocks the port 89, its lower shoulder 97 lying below the lower edge of groove 92.

Figure 4:
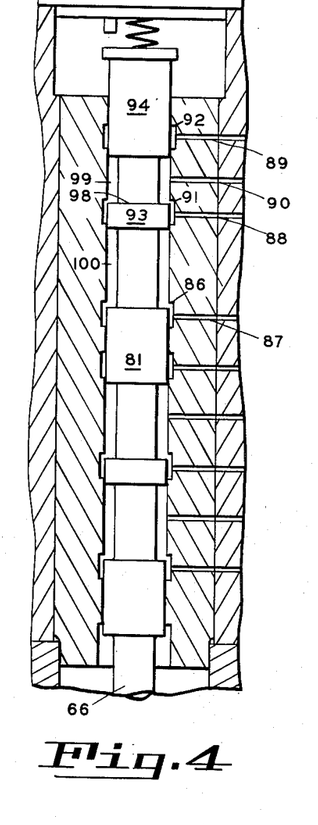
FIG. 4 is a cross-sectional view of the tracer valve showing the valve member moved below its lower blocking position.
Figure 5:
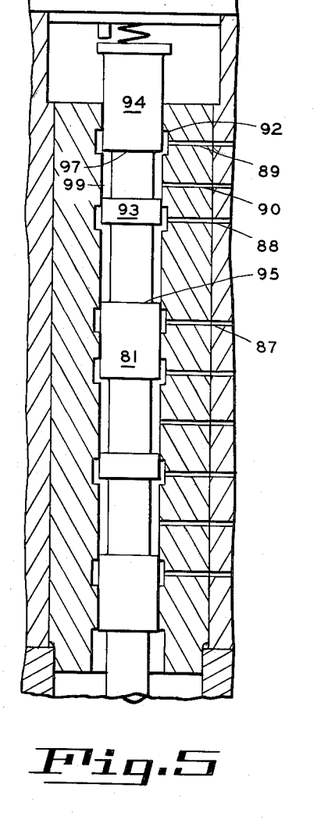
FIG. 5 is a view similar to FIG. 4 but with the valve member moved above its upper blocking position.

When the follower 49 is underdeflected a predetermined amount the valve member 66 is correspondingly lowered a predetermined amount from its null position to a lower blocking position and spool 93 is in registration with groove 91 to block port passage 88. When the follower is underdeflected further beyond the limit corresponding to the lower blocking position of the valve member, the valve member 66 is lowered below that blocking position as shown in FIG. 4, and the upper shoulder 98 of spool 93 drops below the upper edge of groove 91, so that port 88 is connected to port 90 through the annular channel 99 which lies between spools 93 and 94, as shown in FIGURE 4. When the follower is overdeflected a predetermined amount the valve member 66 is correspondingly raised a predetermined amount from its null position to an upper blocking position. With the valve member in this position the upper shoulder 95 of spool 81 is in registration with the upper edge of groove 86 to block the port passage 87, and the lower shoulder 97 of spool 94 is in registration with the lower edge of groove 92. When the follower is overdeflected further beyond the limit corresponding to the upper blocking position of the valve, valve member 66 is raised above the upper blocking position, as shown in FIG. 5. The shoulder 97 of spool 94 is raised above the lower edge of groove 92 and port 89 will be connected through the annular channel 99 to port 90.

The hydraulic system of one embodiment of the present invention is shown in FIGURE 2. In that system a pressure line 106 is connected to pump 107, the pressure in line 106 being established at a predetermined level by relief valve 108, connected to line 106 and discharging to sump 113. The pressure line 106 is connected to pressure port 85 in the valve portion 70. Lines 109 and 110 are connected between sides 36a and 36b of motor 36, respectively, and motor ports 74 and 75 in valve portion 70, line 110 having a throttle valve 111 therein. Discharge ports 72 and 73 in the valve portion 70 are connected to discharge line 112, leading to the sump 113. The fluid pressure in line 112 at the sump may be zero, or may be a relatively low predetermined pressure of about 5 p.s.i. if a relief valve is inserted in line 112 to maintain a slight back pressure, in a typical system. It is important for this invention only that the pressure at the sump define a different pressure level than the pressure level in line 106.

Pressure line 106 is also connected to port 87 of valve portion 71, and port 90 of that portion of the valve is connected to discharge line 112. Interconnected ports 89 and 88 are connected by line 114 to valve 115 and, through the valve, to one side 31b of the motor 31, the other side 31a of the motor being connected to discharge through the valve 115. The valve 115 has a movable plunger 116 received therein which is connected to a lever 117 by which the valve may be manually set to stop motor 31 when the lever is in the position 117a, to cause the motor to move the carriage 13 for traversing under the control of the tracer valve in either direction when the lever is in one or the other of the positions 117b, and to cause the motor to move the carriage 13 in rapid traverse independently of the tracer valve in either direction when the lever is in one or the other of the positions 117c. Thus, although deflection of the tracer valve follower 49 can effect only irreversible operation of the traversing motor when lever 117 is in one of the positions 117b, the valve 115, which is connected between the tracer valve portion 71 and the traversing motor 31, permits selection of the direction of operation of motor 31 by the selection of a particular position 117b for lever 117, and hence valve 115 permits selection of the direction of the tracer controlled relative irreversible traversing movement between the follower 49, which moves with carriage 13, and the pattern 50, which is mounted on bed 10. The valve 115 has connected thereto pressure line 106, motor lines 118 and 119 which are connected respectively to sides 31a and 31b of motor 31, a discharge line 120 connected directly to discharge line 112, a discharge line 121 connected through the throttle valve 122 to discharge line 112, and line 114 connected to passages 88 and 89 of valve portion 71 of the tracer valve. It will be noted that lines 114, 120, and 121 are connected to one end of the valve 115 and, through annular grooves in the valve, to the other end of the valve 115.

When the lever 117 is in the position 117a, the pressure supplied directly to the valve through line 106 is blocked, and pressure which is transmitted through the valve portion 71 and line 114 is also blocked so that the motor 31 is stopped. When the lever is moved to one of its extreme positions 117c, the line 106 is connected directly through valve 115 to lines 118 or 119 and to one or the other side of motor 31 depending on the extreme position to which the lever is moved. The other side of the motor is connected through the other of the lines 118 or 119 to discharge line 120 through the valve 115. Thus, rapid traverse is achieved without reliance on pressure flow through the valve portion 71. When the lever is moved to an intermediate position 117b, for example to the left as shown in FIG. 2, line 114 is connected through groove 123 to groove 124 and through channel 125 to line 119, and side 31b of motor 31, while the other side of the motor is connected through line 118 and channel 126 to line 121, and through the throttle valve 122 to discharge. Thus, in this position of the valve, the motor is operated at a traversing feed rate to move the tool 39 and follower to, for example, the left in FIG. 6. Thus it will be evident that in the embodiment of FIG. 2, when the manually controlled valve 115 is set for pattern controlled traversing, pressure is supplied to one side of motor 31 through the valve portion 71, and the other side of the motor is connected to discharge.

Figures 3, 8:
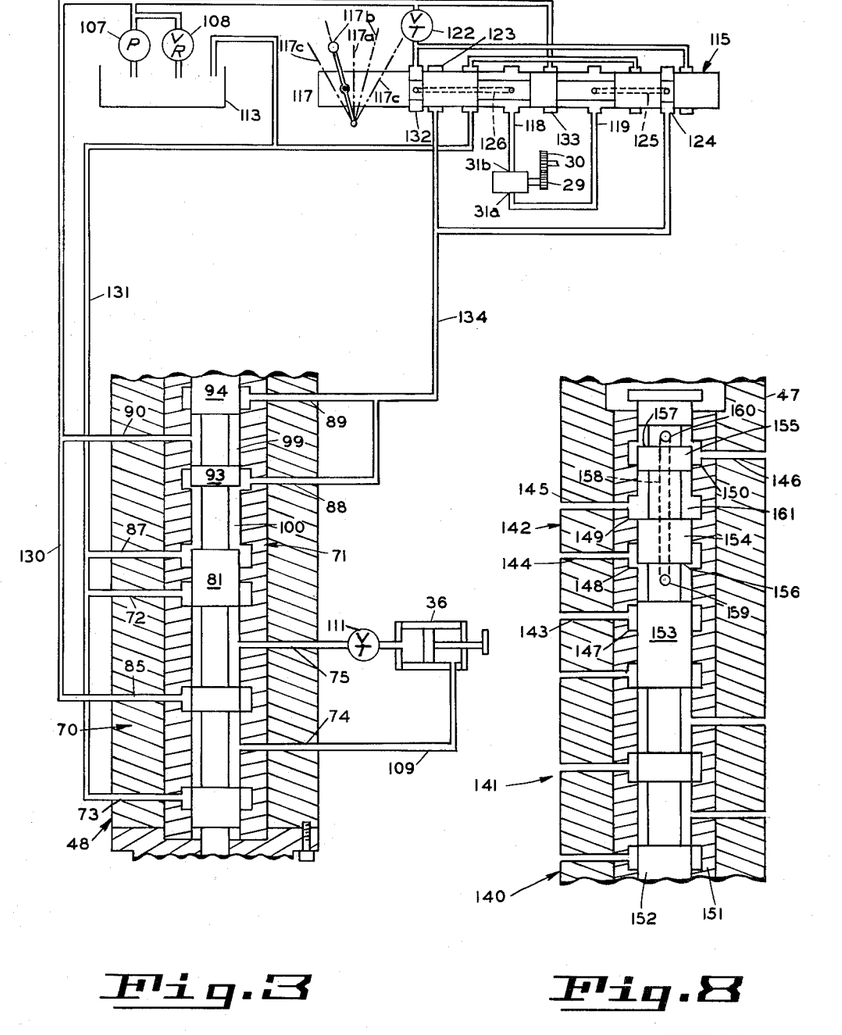
FIG. 3 is a schematic diagram of the hydraulic system of another embodiment of the present invention.
FIG. 8 is a cross-sectional view of a modified tracer valve.

In another embodiment of the present invention, shown in FIG. 3, when the valve 115 is set for pattern controlled traversing, pressure is supplied directly to one side of the motor while the other side of the motor is connected to discharge through the valve portion 71 of the tracer valve. In this embodiment the contouring motor 36 is connected to the reversing portion 70 of the tracer valve 48 in the same manner as the embodiment of FIG. 2. As in that embodiment, the pressure port 85 is connected to a pressure line, and the discharge ports 72 and 73 are connected to a discharge line, the pressure line and discharge line being designated 130 and 131, respectively, in FIG. 3. The pressure line 130 is connected through the throttle valve 122 to groove 132 of valve 115, as well as being connected directly to the groove 133 of that valve. The motor 31 is connected to valve 115, side 31b being connected thereto by line 118 and side 31a being connected thereto by line 119. The connected ports 88 and 89 of valve portion 71 are connected through line 134 to grooves 123 and 124 of valve 115. Thus, when the lever 117 of valve 115 is set in, for example, the left hand position 117b a predetermined pressure is supplied directly to the motor from line 130 through throttle valve 122, groove 132 of valve 115, channel 126, and line 118 to side 31b of the motor. Exhaust from the side 31a passes through line 119, channel 125 of valve 115, line 134 to valve portion 71, through that valve portion and port 87 to discharge line 131.

In the operation of the system of FIG. 2 the lever 117 is set for controlled traversing in one of the traversing positions 117b, for example, to the left as shown. The valve member 66 will hang free below the lower blocking position when the follower 49 is disengaged from the pattern 50, as shown in FIG. 1. At this time pressure to the traversing motor 31 is blocked and pressure is supplied to side 36b of motor 36 so that the slide 37 moves the cutting tool toward the workpiece and the follower toward the pattern. When the follower engages the pattern the valve member is moved up to its null position, stopping the contouring motor 36 and starting the traversing motor to move the carriage 13 in the traversing direction. At this time fluid under pressure is supplied to side 31b of motor 31 from line 106 through port 87, channel 100, port 88, line 114, channel 125 of valve 115, and line 119 while discharge from side 31a occurs through line 118, channel 126, and line 121 and throttle valve 122 to discharge line 112. Thus, since the contouring motor is stopped, the tool and follower will be moved parallel to the axis of the workpiece as shown by arrow B in FIG. 6.

When the follower 49 engages the face 44a of pattern 50 it will be overdeflected to move the valve member 66 above the null position, opening a pressure passage to side 36a of motor 36 through valve portion 70 and closing the pressure passage through valve portion 71 to side 31b of motor 31. Thus, as the traversing motor 31 slows down, the contouring motor 36 will begin to move the slide 37 away from the workpiece. When the valve member 66 reaches its upper blocking position with the shoulder 95 of spool 81 in registration with the upper edge of groove 86, the port 87 will be blocked and thereby isolated from passage 88 so that the traversing motor should stop. However, seepage will occur through the opening 135, as shown in FIG. 7, between spool 81 and the edge of groove 86, and the leaking fluid will pass into passage 88, causing the motor 31 to creep to move the tool 39 and follower 49 in the traversing direction. This will cause additional overdeflection of follower 49 and will move the valve member 66 above its upper blocking position to a position as shown in FIG. 5. Immediately port 88 is connected to discharge through port 89, channel 99, port 90, dissipating the effect of the pressure leakage. At this time then, both sides of motor 31 are connected to discharge, side 31b through line 119, channel 125, line 114, port 89, channel 99, and port 90 to line 112 and side 31a through line 118, channel 126, line 121, throttle valve 122 to line 112, and the creep will be eliminated. Thus the tool and follower will move in the direction of arrow C normal to the axis A of the workpiece.

When the follower reaches the end 44b of portion 44 on the pattern the valve member 66 will drop to its null position, stopping the contouring motor, and the tool will be moved in the direction of arrow D by the traversing motor, machining surface 17b on the workpiece. When the follower reaches surface 44c on the pattern it will be underdeflected and the valve member 66 will drop to its lower blocking position, introducing pressure to one side 36b of motor 36 to move the follower and tool toward the longitudinally extending portions of the pattern and workpiece. The shoulder 96 of spool 93 will be in registration with the lower edge of groove 91 to block port 88 and the traversing motor should be stopped. However, leakage will occur through opening 136 between the spool 93 and the edge of groove 91, and the motor will creep. Thus the follower will continue to move in the traversing direction causing further underdeflection thereof, and allowing the valve member 66 to drop below the lower blocking position as shown in FIG. 4. When this occurs port 88 is immediately connected to discharge port 90 through channel 99, and the pressure leaking through opening 136 is dissipated. At this time both sides of motor 31 are connected to exhaust, side 31b through line 119, channel 125 of valve 115, line 114, port 88, channel 99, port passage 90, and line 112 and side 31a through the same passage as when the valve member was above the upper blocking position. Thus motor 31 is stopped and the tool and follower are moved in the direction indicated by arrow E toward the axis A and normal thereto by the contouring motor 36. Thus it will be seen that any deflection of the follower beyond the predetermined limits corresponding to the blocking positions of the valve resulting from creep which occurs in the traversing motor will serve to move the valve member beyond its blocking positions and immediately connect the leaking pressure to exhaust.

In the operation of the embodiment of FIG. 3, the contouring motor 36 will operate in the same manner as in the embodiment of FIG. 2. In the embodiment of FIG. 3, when the valve 115 is set for controlled traversing to the left, pressure is supplied to the traversing motor 31 to move the carriage in the traversing direction from line 130, throttle valve 122, groove 132 of valve 115, channel 126, and line 118 to side 31b, while discharge occurs from side 31a to line 119, channel 125, line 134, port 88, and, if the valve member 66 is between blocking positions, through channel 100, port 87, and line 131 to the sump 113. When the follower 49 engages face 44a of the pattern and is overdeflected to move the valve member up and that valve member is moved beyond the upper blocking position by virtue of creep, port 89 is connected through channel 99 to port 90, which is connected to pressure line 130. Therefore pressure is supplied through port 89, line 134, channel 125, and line 119 to side 31a of motor 31. Since both sides of the motor are then connected to pressure, the traversing motor is stopped, and the creep is eliminated. Similarly, when the member 66 is dropped below its lower blocking position by virtue of creep, pressure from line 90 is supplied through port 88, line 134, channel 125, and line 119 to side 31a of motor 31 to stop the creep.

In lieu of the tracer valve 48, a valve 140, as shown in FIG. 8, may be used. In that valve the portion 141 controlling the contouring motor 36 may be identical to the valve portion 70 of valve 48 and will not be further described. The portion 142 for controlling the traversing motor 31 comprises ports 143, 144, 145, and 146 terminating respectively in grooves 147, 148, 149, and 150 cut on the inner wall of valve bushing 151 which is snugly received in the housing 47. Spaced spools are carried on the valve plunger 152 which is slidably received in the bushing, spool 153 being associated with port passage 143, spool 154 being associated with port passage 144, and spool 155 being associated with port passage 146. The spools are spaced so that when the valve member 152 is in the null position, as shown, the lower shoulder 156 of spool 154 is above the lower edge of groove 143 while the upper shoulder 157 of spool 155 is below the upper edge of groove 150. With the valve in the null position grooves 148 and 150, and hence the associated passages 144 and 146, are connected by a channel 158 extending through the valve member and having openings 159 and 160 below the shoulder 156 and above the shoulder 157, respectively. When the valve member 152 is dropped to its lower blocking position with shoulder 156 in registration with the lower edge of groove 148, passage 144 will be blocked, and when the valve member 152 is moved to its upper blocking position with shoulder 157 in registration with the upper edge of groove 150, passage 146 will be blocked. When the valve member is dropped below its lower blocking position, passage 143 will be connected through groove 147, channel 158, and groove 150 to passage 146, and when the valve member 152 is moved above its upper blocking position passage 146 will be connected through groove 150, annular channel 161, and groove 149 to passage 145. When this valve is used in the first embodiment described in conjunction with FIG. 2, passage 144 will be connected to pressure, passage 146 will be connected to one side of the motor, and passages 143 and 145 will be connected to exhaust. When used in the second embodiment described in conjunction with FIG. 3, passages 143 and 145 will be connected to pressure, passage 144 will be connected to exhaust, and passage 146 will be connected to one side of the motor.

It will be understood that in a valve constructed in accordance with the present invention the amount that the port passages are opened upon movement of the valve may be quite small, the openings in the drawings having been exaggerated for clarity. In the description and claims it has been stated, for convenience, that the valve member may block or isolate a port passage although it will be understood that seepage may nevertheless occur into or out of a port even though the port is blocked or isolated.

In the preferred construction of the valve the ports and spools are so positioned that the motor port is connected to the second pressure level (the sump in the embodiment of FIG. 2 or the source of pressure in the embodiment of FIG. 3) the instant the valve member is moved from the blocking positions in a direction away from its null position. It will be understood that the spools and ports may be positioned so that the motor port begins to connect with the second pressure level only after slight travel beyond the blocking positions or slightly before the valve member reaches its blocking positions without departing from the spirit or scope of the present invention.

What is claimed is:

1. A hydraulic circuit for controlled irreversible relative traversing movement in a tracing system comprising in combination a hydraulic motor for effecting said relative traversing movement, means establishing hydraulic pressure at a first and second level, a pattern and follower mounted for relative traversing movement in response to operation of said motor, said follower adapted to engage the pattern for control movement thereby, means responsive to the control movement of the follower to connect one side of the motor to the first pressure level when the control movement of the follower is within predetermined limits, means responsive to the control movement of the follower to isolate said one side of said motor from said first pressure level when the follower is at said predetermined limits, means responsive to the control movement of the follower to connect said one side of the motor to the second pressure level when the follower is beyond said predetermined limits, and means to connect the other side of the motor to the second pressure level.

2. A hydraulic circuit for controlled irreversible relative traversing movement in a tracing system comprising in combination a hydraulic motor for effecting said relative traversing movement, fluid at a first predetermined pressure, fluid at a second predetermined pressure, means defining a first fluid passage from said fluid at the first pressure to one side of the motor, means defining a second fluid passage from the fluid at the second pressure to said one side of the motor, means defining a third fluid passage from the other side of the motor to said fluid at the second pressure continuously open during tracing operation, a pattern and follower mounted for relative traversing movement in response to operation of said motor, said follower adapted to engage the pattern for control movement in accordance with the conformation of the pattern, and means responsive to control movement of the follower to open said first passage and close said second passage when the follower is between predetermined limits and to close said first passage and open said second passage as the follower moves past said predetermined limits.

3. A hydraulic circuit for producing controlled irreversible relative traversing movement in a tracer system, the circuit comprising in combination a hydraulic motor for effecting said relative traversing movement, fluid at a first predetermined pressure, fluid at a second predetermined pressure, means defining a first fluid passage from said fluid at the first pressure to one side of the motor, means defining a second fluid passage from the fluid at the second pressure to said one side of the motor, means defining a third fluid passage from the other side of the motor to said fluid at the second pressure, a pattern and a follower mounted for relative traversing movement in response to operation of said motor, said follower adapted to engage the pattern for deflection in accordance with the conformation of the pattern, a valve interposed in said first and second passages, and a valve member in said valve operatively connected to said follower for positioning in a null position on a predetermined deflection of the follower and for movement in either direction from said null position in response to greater or less deflection of the follower than said predetermined amount, the valve member having blocking positions on either side of the null position, said valve member having means to block said second passage and open said first passage when the valve member is between said blocking positions and to block said first passage and open said second passage when the valve member is beyond said blocking positions.

4. In a tracing system operable to produce relative reciprocating movement in one direction and irreversible relative traversing movement in another direction to effect 180 degree tracing in a plane, a hydraulic circuit for effecting said irreversible traversing movement comprising in combination fluid at a first predetermined pressure, fluid at a second predetermined pressure, a hydraulic motor, a pattern and a follower mounted for relative traversing movement in response to operation of said motor, said follower adapted to engage the pattern for deflection in accordance with the conformation of the pattern, a valve, means defining a passage from the fluid at the first pressure terminating at the valve, means defining a passage from one side of the motor terminating at the valve, means defining a passage from the other side of the motor to the fluid at the second pressure, means defining a passage from the fluid at the second pressure terminating at the valve, a movable valve plunger operatively connected to the follower for axial movement in response to deflection thereof slidably received within the valve and having means operable to block said passages terminating at the valve at predetermined positions, said blocking means blocking the passage from the fluid at the first pressure when the plunger is in a first blocking position and blocking the passage from the one side of the motor when the valve plunger is in a second blocking position, said blocking means isolating the passage from the fluid at the second pressure from said other passages when the plunger is between said positions, the movable valve plunger defining means to connect the passage from the fluid at the first pressure and the passage from the one side of the motor when the plunger is between said blocking positions and to connect the passage from the fluid at the second pressure to the passage from the one side of the motor when the plunger is moved beyond said blocking positions.

5. In a 180 degree tracing system, the combination of a first member having a pattern thereon, a second member having a tracer mechanism carried thereby, said tracer mechanism having a follower normally urged to a neutral position and adapted to engage the pattern for deflection in accordance with the conformation thereof, means including a hydraulic motor to effect irreversible relative movement of said members in one direction for relative traversing movement between the follower and the pattern, means to effect relative reciprocating movement of said units at an angle to said one direction for contour determining purposes, hydraulic fluid at a first predetermined pressure, hydraulic fluid at a second predetermined pressure, means defining a communicating passage between the fluid at the first pressure and the tracer mechanism, means defining a communicating passage between one side of the motor and the tracer mechanism, means defining a communicating passage between the other side of the motor and the fluid at the second pressure, means defining a communicating passage between the fluid at the second pressure and the tracer mechanism, a valve plunger in the tracer mechanism operatively connected to the follower for axial movement in response to deflection thereof and having spaced spools thereon, said spools isolating the passage from the fluid at the first pressure when the plunger is in a first blocking position and isolating the passage from the one side of the motor when the plunger is in a second blocking position, said spools isolating the passage from the fluid at the second pressure from the other passages when the plunger is between said blocking positions and isolating the passage from the fluid at the first pressure from the other passages when the valve is moved beyond said blocking positions, said spools defining channels connecting the passage from the fluid at the first pressure and the passage from said one side of the motor when the plunger is between said blocking positions and connecting the passage from said one side of the motor and the passage from the fluid at the second pressure when the valve plunger is moved beyond said blocking positions.

6. In a system for producing 180 degree tracing in a plane, the combination comprising a first hydraulic motor and a second hydraulic motor, a pattern and follower mounted for relative movement in a plane in accordance with the operation of said motors, said follower adapted to engage the pattern for control movement in accordance with the conformation of the pattern, a tracer valve operatively connected to the follower and operable in response to control movement thereof having a first portion connected to the first hydraulic motor to control relative reciprocating contouring movement and having a second portion connected to one side of the second hydraulic motor to control relative irreversible traversing movement, said portions being connected in predetermined relation, the first portion having means operable to stop the first hydraulic motor in one position and to drive said motor alternately in one direction and the other in response to control movement of the follower, fluid at a first predetermined pressure in communication with the second portion of the valve, fluid at a second predetermined pressure in communication with the other side of the second hydraulic motor and in communication with the second portion of the valve, said second valve portion having means to connect said one side of the motor to the fluid at the first pressure in response to positioning of the follower by the pattern within predetermined limits about the position in which the first hydraulic motor is stopped and having means to connect said one side of the motor to the fluid at the second pressure in response to control movement of the follower beyond said predetermined limits.

7. A hydraulic circuit for controlled relative irreversible traversing movement in a 180 degree tracing system comprising in combination a hydraulic motor for effecting said relative traversing movement, a pattern and a follower mounted for said relative traversing movement therebetween, said follower adapted to engage the pattern for control movement thereby, a source of fluid under pressure, a low pressure sump, means defining a first fluid passage from said source to one side of the motor, means defining a second fluid passage from the sump to said one side of the motor, means defining a third fluid passage from the other side of the motor to the sump, and means interposed in said first and second passages operable in response to control movement of the follower within predetermined limits to open said first passage and close said second passage and operable in response to control movement of the follower beyond said limits to close said first passage and open said second passage.

8. In a system for tracing in a plane through 180 degrees, a hydraulic circuit for effecting controlled relative irreversible traversing movement comprising in combination a pattern, a follower normally urged to a neutral position and adapted to engage the pattern for deflection from said neutral position, a tracer valve, a hydraulic motor effective to produce relative traversing movement between the pattern and the follower, said motor having one side thereof connected to the valve, a source of fluid under pressure in communication with the valve, a sump in communication with the valve and the other side of the hydraulic motor, a valve plunger received within the valve and movable in either direction from a null position in response to deflection of the follower, the valve plunger having blocking positions on either side of the null position, means on the valve plunger and movable therewith to isolate the sump from said one side of the motor when the valve plunger is in the null position and isolate the source of fluid under pressure from said one side of the motor when the valve plunger is beyond the blocking positions, said valve plunger defining means connecting the source of fluid under pressure to said one side of the motor when the valve plunger is in the null position and connecting the sump to said one side of the motor when the valve plunger is beyond said blocking positions.

9. A hydraulic circuit for controlled relative irreversible traversing movement in a 180 degree tracing system comprising in combination a hydraulic motor for effecting said relative traversing movement, a pattern for and a follower mounted for said relative traversing movement therebetween, said follower adapted to engage the pattern for deflection thereby in accordance with the conformation of the pattern to effect control movement of the follower, a source of fluid under pressure, a low pressure sump, means defining a first fluid passage from said source to one side of the motor, means defining a second fluid passage from the other side of the motor to the sump, means defining a third passage from the source of pressure to said other side of the motor, and means interposed in said second and third passages operable in response to control movement of the follower within predetermined limits to open said second passage and close said third passage and operable in response to control movement of the follower beyond said limits to close said second passage and open said third passage.

10. In a hydraulic system for tracing in a plane through 180 degrees, a hydraulic circuit for effecting controlled relative irreversible traversing movement comprising in combination a pattern, a follower normally urged to a neutral position and adapted to engage the pattern for deflection from said neutral position, a tracer valve, a hydraulic motor effective to produce relative traversing movement between the pattern and the follower, said motor having one side thereof connected to the valve, a source of fluid under pressure in communication with the valve and the other side of the hydraulic motor, a sump in communication with the valve, a valve plunger received within the valve and movable in either direction from a null position in response to deflection of the follower, the valve plunger having blocking positions on either side of the null position, means on the valve plunger and movable therewith to isolate the source of fluid under pressure from said one side of the motor when the valve plunger is in the null position and isolate the sump from said one side of the motor when the valve plunger is beyond the blocking positions, said valve plunger defining means connecting the sump to said one side of the motor when the valve plunger is in the null position and connecting the source of pressure to said one side of the motor when the valve plunger is beyond said blocking positions.

11. A hydraulic circuit for controlled irreversible relative traversing movement in a 180 degree tracing system comprising in combination a hydraulic motor for effecting traversing movement, fluid at a first predetermined pressure, fluid at a second predetermined pressure, a tracer valve, a first port in the valve in communication with the fluid at said first pressure, a pair of connected motor ports in the valve on one side of said first port in communication with one side of the motor, a second port in the valve between said motor ports in communication with the fluid at the second predetermined pressure, means continuously effecting communication between said fluid at the second predetermined pressure and the other side of the motor, a pattern and a follower mounted for relative traversing movement therebetween in accordance with operation of the motor, said follower adapted to engage the pattern for deflection thereby in accordance with the conformation of the pattern, a valve member slidably received in the valve and operatively connected to the follower for movement in response to deflection thereof, the valve member having three spaced spools thereon, the center spool being substantially the same width as the one motor port adjacent the first port, the center spool and the spool on one side thereof straddling at least a portion of the first port and said adjacent motor port when the valve member is in a null position, the center spool and the spool on the other side thereof straddling the second port and the spool on said other side of the center spool blocking the other motor port when the valve member is in said null position whereby when the valve member is moved in one direction from said null position the one motor port is isolated from the first port and in communication with the second port and when the valve member is moved in the opposite direction from said null position the first port is blocked and the other motor port passage is in communication with the second port.

12. A hydraulic circuit for controlled irreversible relative traversing movement in a 180 degree tracing system comprising in combination a hydraulic motor for effecting traversing movement, a source of fluid under pressure, a sump, a tracer valve, a pressure port in the valve in communication with said source, a pair of motor ports in the valve on one side of said pressure port and in communication with one side of the motor, a discharge port in the valve between said motor ports and connected to the sump, means continuously connecting the other side of the motor to the sump, a pattern and a follower mounted for relative traversing movement therebetween in accordance with operation of the motor, said follower normally urged to a neutral position and adapted to engage the pattern for deflection from said neutral position in accordance with the conformation of the pattern, a valve member slidably received in the valve and operatively connected to the follower for movement in response to deflection thereof, the valve member having three spaced spools thereon, the center spool and the spool on one side thereof straddling at least a portion of the pressure port and the one adjacent motor port when the valve member is in a null position, the center spool and the spool on the other side thereof straddling the discharge port and the spool on the other side of the center spool blocking the other motor port when the valve member is in said null position, the center spool being positioned relative to the one motor port to block the one motor port when the valve member is moved in one direction to a first blocking position and opening said one motor port for communication with the discharge port when moved in said one direction beyond said blocking position, the spool on one side of the center spool being positioned relative to the pressure port to block the pressure port when the valve member is moved in the other direction from said null position to a second blocking position, and said spool on the other side of the center spool being positioned relative to the other motor port to open said other motor port for communication with the discharge port when the valve member is moved in said other direction beyond said second blocking position.

13. A hydraulic circuit for controlled irreversible relative traversing movement in a 180 degree tracing system comprising in combination a hydraulic motor for effecting traversing movement, a source of fluid under pressure, a sump, a tracer valve, a discharge port in the valve in communication with the sump, a pair of motor ports in the valve on one side of said discharge port and in communication with one side of the motor, a pressure port in the valve between said motor ports and connected to the source of pressure, means continuously connecting the other side of the motor to the source of pressure, a pattern and a follower mounted for relative traversing movement therebetween in accordance with the operation of said motor, said follower normally urged to a neutral position and adapted to engage the pattern for deflection from said neutral position in accordance with the conformation of the pattern, a valve member slidably received in the valve and operatively connected to the follower for movement in response to deflection thereof, the valve member having three spaced spools thereon, the center spool and the spool on one side thereof straddling at least a portion of the discharge port and the one adjacent motor port when the valve member is in a null position, the center spool and the spool on the other side thereof straddling the pressure port and the spool on the other side of the center spool blocking the other motor port when the valve member is in said null position, the center spool being positioned relative to the one motor port to block the one motor port when the valve member is moved in one direction to a first blocking position and opening said one motor port for communication with the pressure port when moved in said one direction beyond said blocking position, the spool on one side of the center spool being positioned relative to the discharge port to block the discharge port when the valve member is moved in the other direction from said null position to a second blocking position, and said spool on the other side of the center spool being positioned relative to the other motor port to open said other motor port for communication with the pressure port when the valve member is moved in said other direction beyond said second blocking position.

14. A hydraulic circuit for controlled irreversible relative traversing movement in a 180 degree tracing system comprising in combination a hydraulic motor for effecting traversing movement, fluid at a first predetermined pressure, fluid at a second predetermined pressure, a tracer valve, a pair of connected ports in the valve in communication with the fluid at the second pressure, a motor port in the valve on one side of said connected ports and in communication with one side of the motor, a port in the valve between said connected ports and in communication with the fluid at the first pressure, means continuously effecting communication between said fluid at the second predetermined pressure and the other side of the motor, a pattern and a follower mounted for relative traversing movement therebetween in accordance with the operation of said motor, said follower adapted to engage the pattern for deflection thereby in accordance with the conformation of the pattern, a valve member slidably received in the valve and operatively connected to the follower for movement in response to deflection thereof, the valve member having three spaced spools thereon and a channel therethrough with a first opening between one end spool and the center spool and a second opening beyond the other end spool, said one end spool being positioned to block one of said connected ports and the other end spool being positioned to effect communication between the motor port and the second opening beyond said spool and to isolate said motor port from the other of said connected ports when the valve member is in a null position, the center spool being positioned to effect communication between said first opening and the port connected to the first pressure and to isolate said port from the other of said connected ports when the valve member is in said null position, the valve member defining a first blocking position when moved in one direction from the null position to a position where said center spool blocks the port connected to the first pressure and defining a second blocking position when moved in the opposite direction to a position where the other end spool blocks the motor port, said spools being positioned relative to each other and the valve ports to effect communication between said one connected passage and the first opening in the valve member when the valve member is moved in said one direction beyond its first blocking position and to effect communication between said motor port and the other of said connected ports when moved in the opposite direction beyond said second blocking position.

15. A hydraulic circuit for controlled irreversible relative traversing movement in a 180 degree tracing system comprising in combination a hydraulic motor for effecting traversing movement, a source of fluid under pressure, a sump, a tracer valve, a pair of discharge ports in the valve in communication with the sump, a motor port in the valve on one side of the discharge ports and in communication with one side of the motor, a pressure port in the valve between said discharge ports and in communication with the source of fluid under pressure, means continuously effecting communication between the sump and the other side of the motor, a pattern and a follower mounted for relative traversing movement therebetween in accordance with operation of the motor, said follower adapted to engage the pattern for deflection thereby, a valve member slidably received in the valve and operatively connected to the follower for movement in response to deflection thereof, the valve member having three spaced spools thereon and a channel therethrough with a first opening between one end spool and the center spool and a second opening beyond the other end spool, the center spool positioned to block said pressure port when the valve member is moved in one direction to and beyond a first blocking position and to effect communication between the pressure port and the first opening when the valve member is moved in the opposite direction from the first blocking position, the spool on one end positioned to effect communication between one discharge port and said first opening when the valve member is moved in said one direction beyond the first blocking position and to block said discharge port when the valve member is moved in the opposite direction from said first blocking position, the spool at the other end positioned to block the motor port when the valve member is moved in said opposite direction from said first blocking position to a second blocking position, said other end spool effecting communication between the motor port and the second opening when the valve member is moved in said one direction from the second blocking position and effecting communication between said motor port and the other discharge port when moved in the opposite direction from said second blocking position.

16. A hydraulic circuit for controlled irreversible relative traversing movement in a 180 degree tracing system comprising in combination a hydraulic motor for effecting traversing movement, a source of fluid under pressure, a sump, a tracer valve, a pair of pressure ports in the valve and in communication with the source of pressure, a motor port in the valve on one side of the pressure ports and in communication with one side of the motor, a discharge port in the valve between said pressure ports and in communication with the sump, means continuously effecting communication between the source of fluid under pressure and the other side of the motor, a pattern and a follower mounted for relative traversing movement therebetween in accordance with the operation of said motor, said follower adapted to engage the pattern for deflection thereby, a valve member slidably received in the valve and operatively connected to the follower for movement in response to deflection thereof, the valve member having three spaced spools thereon and a channel therethrough with a first opening between one end spool and the center spool and a second opening beyond the other end spool, the center spool positioned to block said discharge port when the valve member is moved in one direction to and beyond a first blocking position and to effect communication between the discharge port and the first opening when the valve member is moved in the opposite direction from the first blocking position, the spool on one end positioned to effect communication between one pressure port and said first opening when the valve member is moved in said one direction beyond the first blocking position and to block said one pressure port when the valve member is moved in the opposite direction from said first blocking position, the spool at the other end positioned to block the motor port when the valve member is moved in said opposite direction from said first blocking position to a second blocking position, said other end spool effecting communication between the motor port and the second opening when the valve member is moved in said one direction from the second blocking position and effecting communication between said motor port and the second pressure port when moved in the opposite direction from said second blocking position.

References Cited in the file of this patent
UNITED STATES PATENTS

| | | |
|---|---|---|
| 2,362,349 | Bryant | Nov. 7, 1944 |
| 2,464,626 | Waterson | Mar. 15, 1949 |
| 2,516,495 | Waterson | July 25, 1950 |
| 2,791,885 | Sassen | May 14, 1957 |
| 2,796,793 | Addison et al. | June 25, 1957 |